T. B. CAMPBELL, Sr.
ROTARY GLASS POT.
APPLICATION FILED APR. 5, 1911.
1,025,680.
Patented May 7, 1912.
3 SHEETS—SHEET 1.
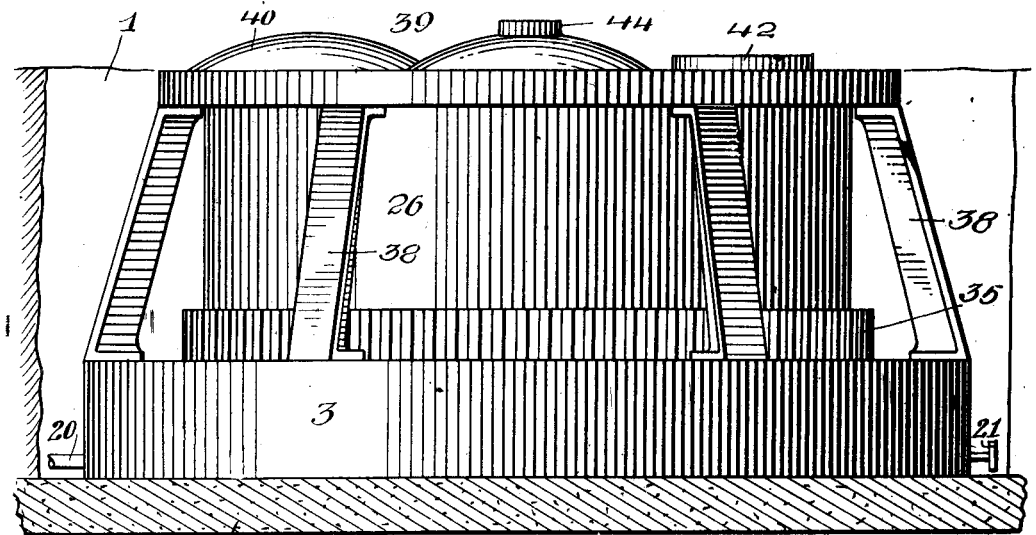
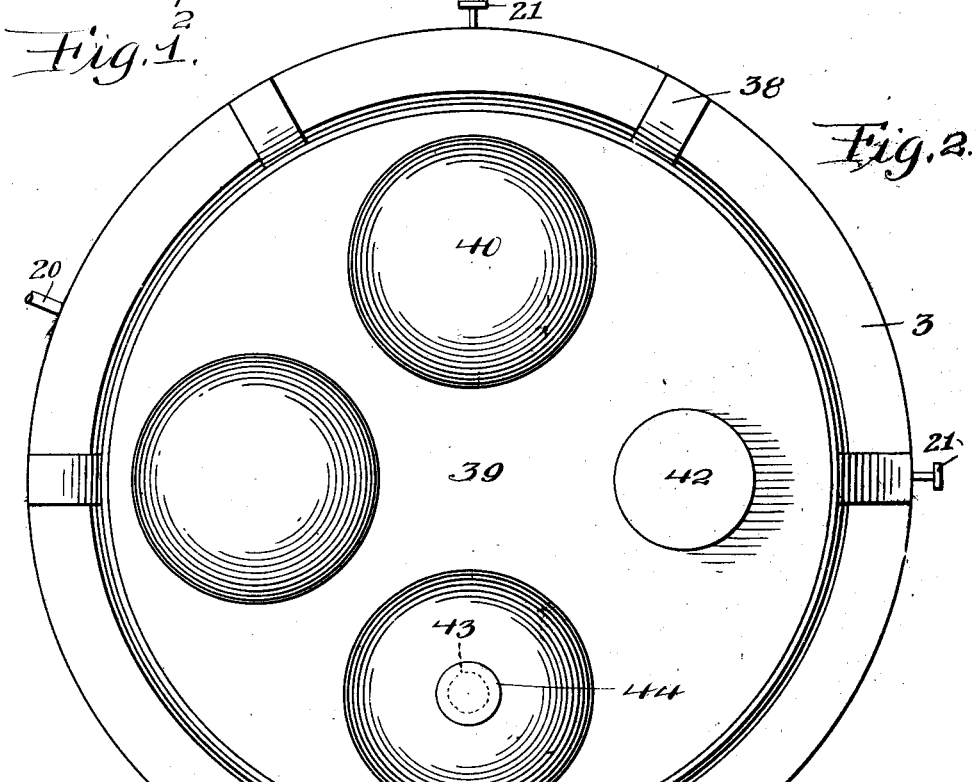
WITNESSES
INVENTOR.
T. B. Campbell, Sr.
BY
ATTORNEYS T. B. CAMPBELL, Sr.
ROTARY GLASS POT.
APPLICATION FILED APR. 5, 1911.

1,025,680.

Patented May 7, 1912.

3 SHEETS—SHEET 2.

WITNESSES:

INVENTOR.
T. B. Campbell, Sr.
BY
ATTORNEYS.

T. B. CAMPBELL, Sr.
ROTARY GLASS POT.
APPLICATION FILED APR. 5, 1911.
1,025,680.
Patented May 7, 1912.
3 SHEETS—SHEET 3.
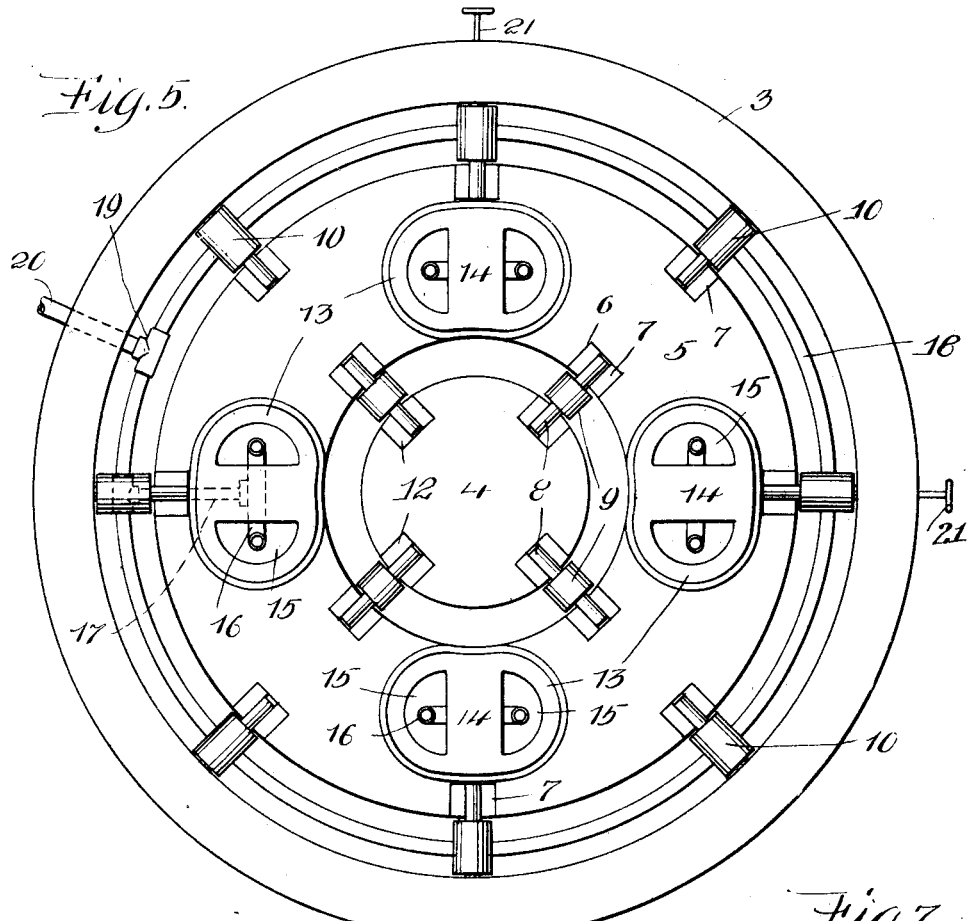
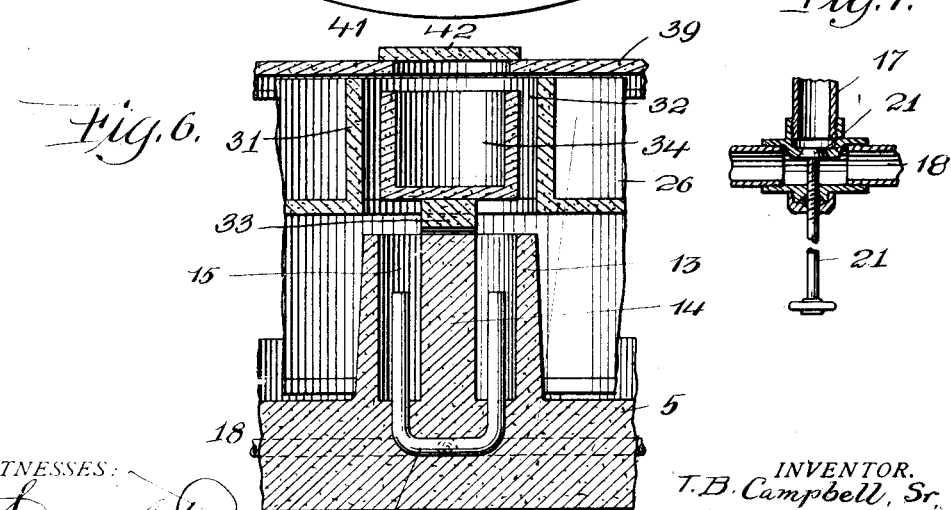
WITNESSES:
Samuel Payne
R H Butler
INVENTOR.
T. B. Campbell, Sr.
BY N. C. Everts Co.
ATTORNEYS.

UNITED STATES PATENT OFFICE.

THOMAS B. CAMPBELL, SR., OF PITTSBURGH, PENNSYLVANIA.

ROTARY GLASS-POT.

1,025,680.  Specification of Letters Patent.  Patented May 7, 1912.

Application filed April 5, 1911. Serial No. 619,055.

*To all whom it may concern:*

Be it known that I, THOMAS B. CAMPBELL, Sr., a citizen of the United States of America, residing at Pittsburgh, in the county of Allegheny and State of Pennsylvania, have invented certain new and useful Improvements in Rotary Glass-Pots, of which the following is a specification, reference being had therein to the accompanying drawing.
This invention relates to rotary glass pots, and the objects of my invention are to provide a revoluble pot holder that can be intermittently moved to position pots whereby they can be filled and glass gathered or withdrawn from the same; and to provide a glass pot with means, in a manner as will be hereinafter set forth, whereby the glass within the pot can be maintained at a desired temperature.
Other objects of my invention are to provide a glass pot that will reduce the cost of manufacturing various kinds of glassware to a minimum, and facilitate the operation of gathering batches of glass whereby a more uniform product will be obtained without the loss of glass.

Further objects of my invention are to furnish a pot with a plurality of individual receptacles that can be easily and quickly shifted into position whereby a fresh batch of molten glass will be presented for each gathering operation, and to provide simple and effective means for separately controlling the temperature of the glass in each receptacle, whereby the glass can be maintained at the proper consistency and fluidity for gathering purposes.

With the above and other objects in view which will more readily appear as the invention is better understood, the invention resides in the novel construction, combination and arrangement of parts to be hereinafter specifically described and then claimed.

Reference will now be had to the drawings, wherein like numerals of reference designate corresponding parts throughout the several views, in which:—

Figure 3:
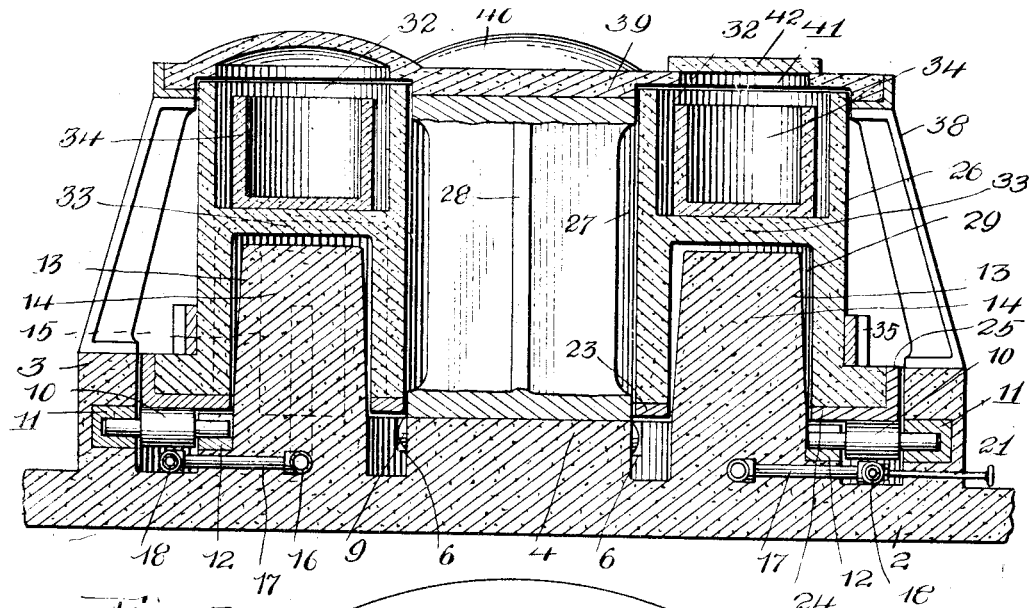
Figure 4:
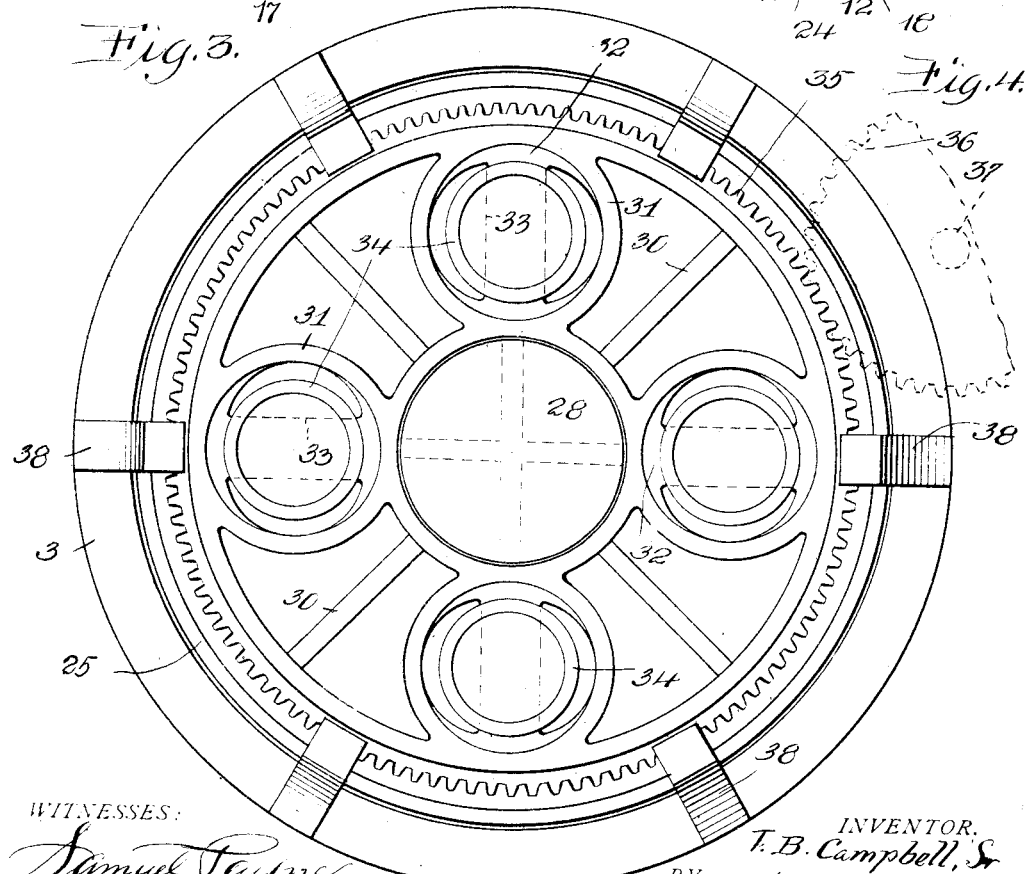

Figure 1 is a side elevation of a glass pot in accordance with this invention, Fig. 2 is a plan of the same, Fig. 3 is a vertical cross sectional view of the pot, Fig. 4 is a plan of the pot with the cover thereof removed. Fig. 5 is a plan of the foundation and heaters of the pot, Fig. 6 is a vertical sectional view of a portion of the pot showing one of the heaters and one of the receptacles thereof, and Fig. 7 is a horizontal sectional view of one of the gas regulating valves of the pot.

For a successful operation of the glass pot, it is preferable to locate the same in a pit 1 and concrete, fire clay, fire brick or other non-fusible material can be used in constructing the pit and the greater part of the pot. The bottom 2 of the pit is provided with an annular wall 3 and located centrally of the bottom of the pit is a circular base 4. Surrounding the base 4 is an annular support 5, said support having the inner and outer walls thereof recessed at diametrically opposed points, as at 6 for bearing blocks 7. Revolubly supported by said bearing blocks are the spindles 8 of two sets of rollers 9 and 10, the spindles of the rollers 10 extending into bearing blocks 11 provided therefor in the wall 3 and the spindles of the rollers 9 extending on to bearing blocks 12 provided therefor in the wall of the base 4. The rollers of each circumferentially arranged set are equally spaced, and the purpose of these rollers will presently appear. The support 5 at equally spaced points is provided with oval vertical heater shells 13 having vertical transverse partitions 14 dividing each shell into two compartments 15.

Embedded in the support 5 are U-shaped burners 16 having the ends thereof extending upwardly into the compartments 15 of each shell. The burners 16 are connected by outwardly extending pipes 17 to a pipe 18 arranged between the support 5 and the wall 3, said pipe having a T 19 connected to a gas supply pipe 20 that extends through the wall 3. At the juncture of the pipe 17 and the pipe 18 there are regulating valves 21 having the stems 22 thereof extending through the wall 3. It is only necessary to use two regulating valves to control the temperature of glass to be drawn from the pot, as will hereinafter appear.

Located upon the sets of rollers 9 and 10 are circular rings 23 and 24, the former resting upon the set of rollers 9 and the latter upon the set of rollers 10, the ring 24 having a rim 25 flush with the upper edges of the wall 3. Located upon the rings 23 and 24 is a cylindrical vertical housing 26 having a central vertical opening 27 providing clearance for a pedestal 28 mounted upon the base 4. The pedestal 28 is adapted to support a circular top plate to be hereinafter referred to. Preferably the pedestal 28 is provided with a spider. The housing 26 has the bottom thereof open to provide an annular passage-way 29 for the heater shells 13 with the lower walls of said housing of a greater thickness than the upper walls. The walls of the housing are connected by straight webs 30 and curved webs 31, the latter providing compartments 32 that have the bottoms thereof provided with transverse beams 33 adapted to support individual pots or receptacles 34 in the compartments 32. Encircling the housing 26 is a rack 35 and meshing with said rack is a pinion 36 carried by a driven shaft 37 and it is through the medium of the shaft 37 and the pinion 36 that the rack 35 and the housing supported by the rollers are intermittently moved.

Mounted upon the wall 3 are a plurality of equally spaced uprights 38 coöperating with the pedestal 28 in supporting a cover 39, said cover having equally spaced domes 40 and an opening 41 that is normally closed by a lid 42. One of the domes 40 is provided with an opening 43 normally closed by a lid 44.

In operation, the housing is intermittently moved, whereby the different individual pots or receptacles will be successively shifted beneath the opening 41 of the cover 39. It is through this opening that glass is drawn or gathered from the individual pot or receptacle positioned beneath said opening. When a batch of glass has been gathered or drawn, the housing is immediately moved to place the empty or partially emptied pot or receptacle beneath the opening 43, whereby the individual pot or receptacle can be charged or supplied with the ingredients of glass. As the pot or receptacle is charged, it is subjected to a high degree of heat by the burner located beneath the pot or receptacle, and as the housing is again moved, the filled pot or receptacle is shifted over another burner to receive a high degree of heat, but when it is shifted to the next burner, this burner is regulated whereby the molten contents of the pot or receptacle will be maintained at a proper consistency conducive to an economic and rapid gathering or drawing of the glass, when the pot or receptacle is shifted beneath the opening 41. The burner located beneath the opening 41 is regulated whereby the glass will be maintained at the proper temperature while being gathered or drawn, and it is through the medium of the regulating valves that the entire glass pot can be operated to maintain the glass in proper condition for gathering purposes. The cap 42 is placed over the opening 41 only when the pot is started, in order to obtain the initial heat. Then the cap 42 is removed and the products of combustion escape through the opening 41. The opening 43 is not closed during the operation of the machine and said opening 43 in connection with the opening 41 in a majority of cases is sufficient for the escape of the products of combustion.

The burners are of a construction that insures an intense heat beneath the individual pots or receptacles, and the domes 40 of the cover deflect the heat and flames into the pots or receptacles and rapidly reduces the solid matter placed therein to a fluid condition.

The pot is not limited to the number of individual receptacles employed or to the location of the gathering or refilling points, and while in the drawings there is illustrated a preferred embodiment of the invention, it is to be understood that the structural elements thereof are susceptible to such changes as fall within the scope of the appended claims.

What I claim is:—

1. A glass pot comprising a foundation, rollers revolubly supported by said foundation, a housing revolubly mounted upon said rollers, a plurality of heaters arranged upon said foundation and extending upwardly into said housing, individual pots supported by said housing, and a cover arranged above said housing.

2. A glass pot comprising a foundation, a plurality of heaters carried by said foundation, an intermittently moving housing arranged upon said foundation and inclosing said heaters, individual pots supported in said housing and adapted to be successively moved from one heater to the other, and means adapted to intermittently move said housing.

3. In a glass pot a foundation, sets of circumferentially arranged rollers supported by said foundation, heaters equally spaced upon said foundation, a gas burner arranged in each heater, a housing movably arranged upon said rollers and inclosing said heaters, and individual pots arranged in said housing above said heaters.

4. In a glass pot a foundation, sets of circumferentially arranged rollers supported by said foundation, heaters equally spaced upon said foundation, a gas burner arranged in each heater, a housing movably arranged upon said rollers and inclosing said heaters, individual pots arranged in said housing above said heaters, and a cover supported from said foundation and adapted to inclose the top of said housing.

5. In a glass pot a foundation, sets of circumferentially arranged rollers supported by said foundation, heaters equally spaced upon said foundation, a gas burner arranged in each heater, a housing movably arranged upon said rollers and inclosing said heaters, individual pots arranged in said housing above said heaters, a cover supported from said foundation and adapted to inclose the top of said housing, and means including a rack and pinion adapted to intermittently move said housing.

6. In a glass pot, a plurality of circumferentially arranged heater shells, a burner in each shell, a housing rotatably mounted over said shells and individual pots arranged in said housing and adapted to be successively moved from one heater shell to the other heater shell by said housing.

7. In a glass pot, a plurality of circumferentially arranged heater shells, a burner in each shell, a housing rotatably mounted over said shells, individual pots arranged in said housing and adapted to be successively moved from one heater shell to the other heater shell by said housing, and a cover arranged above said housing and inclosing the top thereof.

8. In a glass pot, stationary heaters each arranged in a separate chamber, a receptacle, and a housing adapted to move said receptacle successively over each of said heaters.

9. A glass pot comprising a plurality of heaters each arranged in a separate chamber, a receptacle, a housing inclosing said receptacle, and means adapted to intermittently move said housing to subject said receptacle successively to each of said heaters.

10. A glass pot comprising a plurality of heaters each arranged in a separate chamber, a receptacle, and means for intermittently moving said receptacle to be successively acted on by each of said heaters.

11. A glass pot comprising a plurality of independent burners, a series of receptacles, and means for moving said receptacles successively from one burner to the other.

12. A glass pot comprising a plurality of individual receptacles, means for successively shifting said receptacles whereby a fresh batch of molten glass will be presented for each gathering operation, and means for independently heating each of the receptacles.

13. A glass pot comprising a foundation, rollers revolubly supported by said foundation, a housing revolubly mounted upon said rollers, a plurality of independent heaters arranged upon said foundation and extending upwardly into said housing, individual pots supported by said housing, and means for shifting the housing whereby each of said pots is successively acted on by each of said heaters.

14. A glass pot comprising a foundation, a housing revolubly mounted thereon, a plurality of heaters each arranged in a separate chamber upon said foundation and extending upwardly toward said housing, individual pots supported by said housing, and means whereby each of the pots is shifted to be successively acted on by said heaters.

15. A glass pot comprising a foundation, a housing revolubly mounted upon said foundation, a plurality of vertically disposed independent heaters supported by the foundation, individual pots supported by the housing, means for moving the housing whereby each of said pots are successively acted on by said heaters, and a cover arranged above said housing.

16. In a glass pot, a plurality of vertically disposed stationary heaters each arranged in an independent chamber, a receptacle, a housing for supporting the receptacle above the heaters, and means whereby said housing is shifted for subjecting said receptacle successively to each of said heaters.

In testimony whereof I affix my signature in the presence of two witnesses.

THOMAS B. CAMPBELL, Sr.

Witnesses:
 Max H. Srolovitz,
 Christina T. Hood.